C. E. F. AHLM.
BATTERY CHARGING AND STARTING SYSTEM FOR AUTOMOBILES.
APPLICATION FILED OCT. 31, 1918.
1,352,166.
Patented Sept. 7, 1920.
2 SHEETS—SHEET 1.
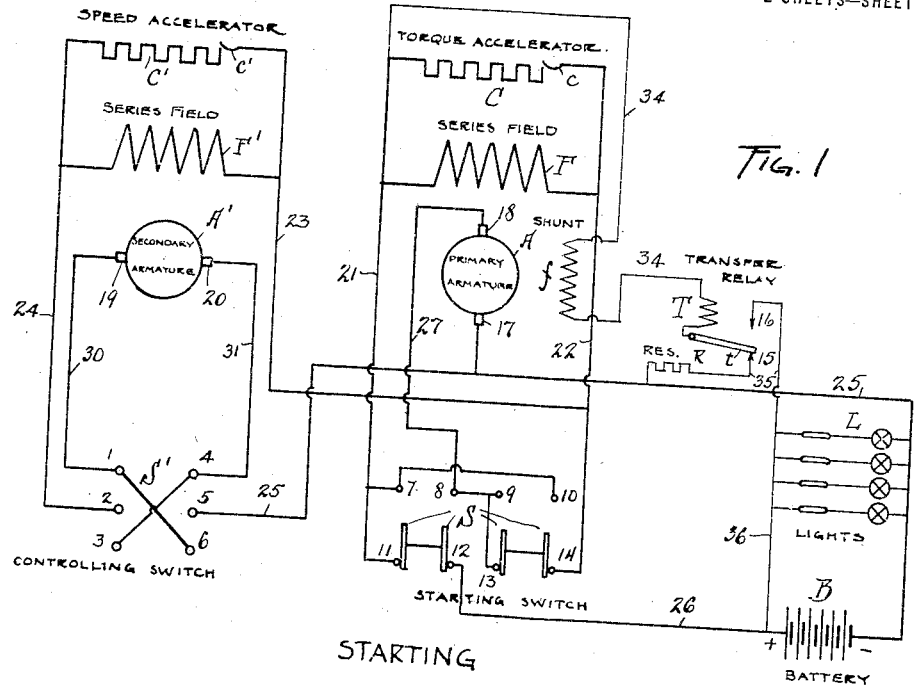
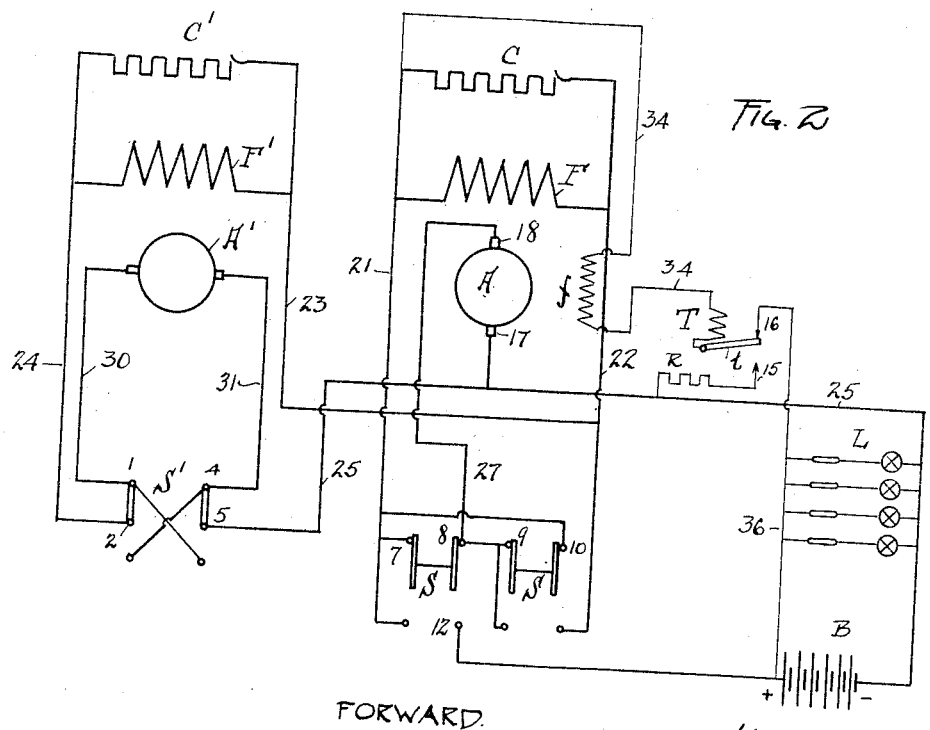

C. E. F. AHLM.
BATTERY CHARGING AND STARTING SYSTEM FOR AUTOMOBILES.
APPLICATION FILED OCT. 31, 1918.
1,352,166.
Patented Sept. 7, 1920.
2 SHEETS—SHEET 2.
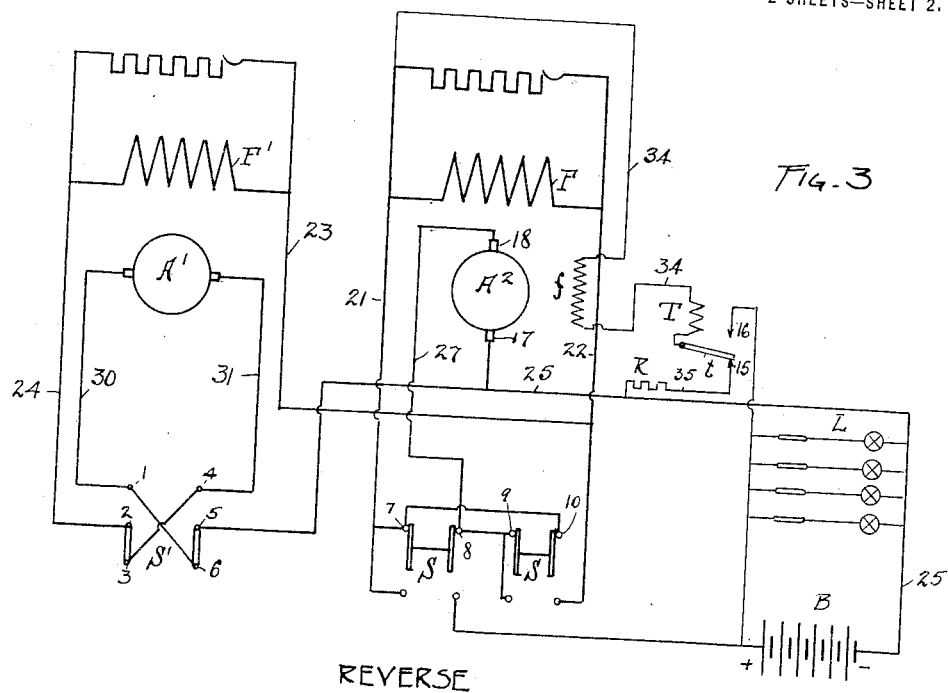
REVERSE
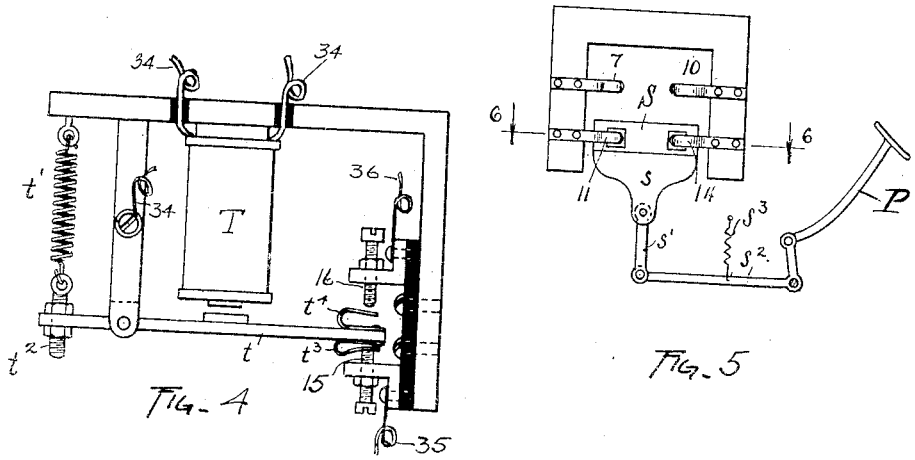
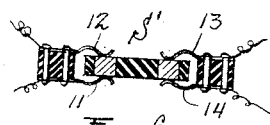
INVENTOR
Charles E. F. Ahlm,
By Baker & Macklin,
ATTORNEYS.

UNITED STATES PATENT OFFICE.

CHARLES E. F. AHLM, OF CLEVELAND HEIGHTS, OHIO.

BATTERY-CHARGING AND STARTING SYSTEM FOR AUTOMOBILES.

1,352,166.

Specification of Letters Patent.

Patented Sept. 7, 1920.

Application filed October 31, 1918. Serial No. 260,441.

*To all whom it may concern:*

Be it known that I, CHARLES E. F. AHLM, a citizen of the United States, residing at Cleveland Heights, in the county of Cuyahoga and State of Ohio, have invented a certain new and useful Improvement in Battery-Charging and Starting Systems for Automobiles, of which the following is a full, clear, and exact description, reference being had to the accompanying drawings.

This invention is concerned with that type of automobile transmission wherein there is a primary armature driven by the engine and a secondary armature connected with the propeller shaft, these two members, though free to rotate independently from each other, being electro-magnetically connected by means of fields and inductive resistance so that any desired proportion of the speed or power of the primary armature may be transmitted to the secondary. By varying the electro-magnetic relation the operator may change the speed and torque relations between the engine shaft and the propeller shaft as desired.

The present invention is concerned with the battery charging and starting features which may accompany this system of transmission.

In my system the primary dynamo is compound wound, having a series field and a shunt field. I connect the battery so that it may be in series with the shunt field when a sufficient current is flowing to charge the battery, while when the battery is not being charged an artificial resistance, approximately corresponding to the resistance of the battery, is inserted in series with the shunt. An adjustable relay controls the connection to this inserted resistance or to the battery, alternatively and is itself in series with the shunt field, and is adapted to bring the battery into circuit whenever the voltage produced is suitable for charging the battery. I call this a transfer relay.

I have found that by the employment of the primary and secondary armatures, the former having a shunt winding, and placing the transfer relay in series with this shunt and providing either of two paths of approximately the same resistance to complete the circuit, I am enabled to obtain an efficient and satisfactory operation irrespective of the speed. The total shunt resistance remains substantially constant for all speeds, while the battery does not come into action until the speed is suitable for it.

My system is adapted for a very simple control. A main switch determines whether the circuits are set for starting or for forward movement or for reverse movement. A controlling switch determines the actual energization of the set circuits. An additional variable shunt is provided about each series field to furnish accelerators. The variation of the resistance in these shunts provides for increase of torque at the expense of speed or increase of speed at the expense of torque, according to whether the machine is climbing a hill or running on a level.

The above mentioned features will be described more fully in connection with the illustrative diagrams shown, and the essential characteristics of the invention will be summarized in the claims.

In the drawings, Figure 1 is a diagram illustrating the electric parts and the circuits set for starting; Fig. 2 is a similar diagram showing the position of the parts for forward running; Fig. 3 is a similar diagram showing the parts for reverse running; Fig. 4 is a side elevation of one embodiment of the transfer relay; Fig. 5 is an elevation of one form of starting switch in its abnormal or starting position; Fig. 6 is a cross section of such form of starting switch, as indicated by the line 6—6 on Fig 5.

In Figs. 1, 2 and 3, A indicates the primary armature, which is designed to be directly connected to the crank shaft of the engine; F indicates the series field of this armature, and $f$ the shunt field thereof. A' indicates the secondary armature which is connected with the propeller shaft of the automobile, and F' the field of this secondary machine, which is in series with the armature. S' represents the controlling switch, which may be a double-pole double-throw knife switch adapted to disconnect the secondary armature or leave it in direct or reversed connection with the primary machine. S indicates the starting switch, which normally sets the circuits for running but may be operated to start the engine, this starting switch being conveniently operated by a foot-pedal indicated at P. B indicates the battery, which is adapted to be charged by the primary dynamo to furnish the current for starting the engine. T designates the transfer relay, which is adjustable for various speeds and is adapted to maintain a resistance R in series with the shunt $f$ of the primary armature for low speeds, but substitute the battery B for such resistance for higher speeds, the resistance R and the battery B having substantially the same resistance. L indicates a set of individual lights and their switches connected in parallel with each other and across the battery.

C and C' indicate variable resistances in shunt about the series fields F and F' respectively. The cutting out of these resistances, accomplished by shifting the contact members with reference thereto, or in other manner, weakens the series fields, and in the case of the primary machine increases the torque of the propeller shaft and in case of the secondary machine increases the speed of the propeller shaft. The accelerator C therefore is employed when much work at low speed is required, as when climbing a hill, or in getting the machine under way; accelerator C' being brought into action where the work is light and speed is desired, as running on a long level stretch.

In the diagrams the numerals 1—6 designate the terminal contacts of the controlling switch; the numerals 7—14 the terminal contacts of the starting switch, and the numerals 15 and 16 the contacts of the transfer relay.

I will now trace the circuits shown in the various diagrams. The line 21 leads from the series field and torque accelerator of the primary machine to the terminals, 7, 10 and 11 of the starting switch. The other line 22 from the other side of this series field and accelerator leads to the starting switch terminal 14. A line 23 from the series field and accelerator of the secondary armature connects with the line 22, while a line 24 from the other side of the secondary field and accelerator leads to the controlling switch central terminal 2. The other central terminal 5 is connected by the line 25 with the battery B and by branch lines from this line with the primary brush 17 and the resistance R. The line 26 leads from the battery to the starting switch terminal 12. The line 27 from the other primary armature brush 18 leads to the starting switch contacts 8, 9 and 13.

The armature of the secondary machine is connected by lines 30 and 31 with the contact points 1 and 4 of the controlling switch. The point 1 is cross connected with the point 6 and the point 4 with the point 3, as is usual in double-throw double-pole switches. The shunt circuit of the primary armature leads via a line 34 from the line 21 through the shunt f and the magnet of the relay T to the relay armature t. This armature contacts either with the point 15 forming a terminal of the line 35 to the resistance R or with the contact 16 forming a terminal of the line 36 to the battery on the side where the line 26 joins it. Various lights L and their individual switches are located in parallelism with each other between the lines 25 and 36.

The construction and arrangement of my system may be best understood from a description of its operation. Assuming that the device is used for starting the engine, the car remaining stationary, the parts are in the position shown in Fig. 1. The secondary machine is now idle by reason of the controlling switch being open, the blades being out of contact with any of the points 1, 4, 3 or 6. The starting switch S, which is normally in the raised position of Figs. 2 and 3, is depressed by the foot-pedal into the position shown in Figs. 1 and 5, connecting the contact points 11 and 12 together and the points 13 and 14 together. When thus connected the current from the battery B flows via the line 26 to the terminal 12, to the terminal 11, via the line 21 through the field F, via the line 22 to the terminal 14, through the switch to the terminal 13, via the line 27 to the armature brush 18, through the armature to the brush 17, via the line 25 to the other side of the battery; while a shunt from the line 21 passes via the line 34 through the winding f, through the relay magnet T, the armature t, contact terminal 15, line 35, through the resistance R, to the line 25 and battery.

The connections just described polarize the machine so that the current from the battery enters it in the right direction for starting, the primary armature being driven by the battery in the same direction as that which the engine when operating by its internal combustion gives it. As the controlling switch is open for starting, it follows that all that it is necessary to do to start the engine is to depress the pedal P, thus drawing down the starting switch into the position shown in Fig. 5. After the engine has been thus speeded up, the removal of the foot pressure from the pedal allows the starting switch to come into the normal position shown in Figs. 2 and 3 and the automobile is ready for forward or reverse running when the controlling switch is closed, as next described.

To place the car in condition for forward running the knife switch S' is thrown into engagement with the upper contacts 1 and 4, the starting switch being already in the raised position and contacting with the terminals 7, 8, 9 and 10, as illustrated in Fig. 2. The transfer relay, however, at the beginning of the running, remains down instead of in the elevated position shown in Fig. 2. Accordingly the battery is entirely disconnected, being open at the terminals 12 and 16. The armature A is now positively driven by the internal combustion engine connected with it and the current generated passes to and energizes the secondary machine. Thus the current passes from the armature brush 17 via the line 25 to the terminal 5, to the terminal 4, via the line 31 through the armature A' to the line 30, to the terminal 1, to the terminal 2, via the line 24 through the secondary field F' to the line 23, to the line 22, through the primary field F to the line 21, to the terminals 7 and 10, thence through the switch to the terminals 8 and 9, to the line 27, and thence to the brush 18.

A shunt circuit about the main field is also established from the junction of the lines 22 and 21 via the line 34 through the relay magnet T, relay armature winding $f$, relay magnet T, relay armature $t$, contact point 15, and resistance R to the line 25 and the brush 17. The current generated by the primary machine therefore energizes the secondary machine and is adapted to drive the automobile.

Accordingly the current generated by the primary machine driven by the engine operates the secondary machine, which rotates the propeller shaft and drives the vehicle. The speed of the vehicle is ordinarily controlled by the usual engine throttle and spark.

When unusually high torques are desired, however, as in hill climbing, etc., I may use the accelerator C, which is adapted to form a variable shunt about the main field F. As this shunt is closed it shunts some of the current from the series field and thereby weakens this field, taking some of the load off the engine, which allows the engine to speed up, increasing the speed of rotation of the primary armature and thus producing a greater energization and a higher torque of the secondary armature. The more the resistance C is cut out the more nearly will the series field be short circuited and the greater will be the weakening of it, and hence the less the load on the engine, and the higher the speed of the engine, and therefore the greater the torque at the secondary armature and the propeller shaft. Accordingly when the contact $c$ is shifted to the extreme left in the diagram the engine is allowed to race, producing a high torque with a slow propelling speed on the propeller shaft. When the conditions requiring high torque cease, the contact $c$ is shifted toward the right, and, when it reaches the position shown in Fig. 2 the machine is running normally.

If the conditions are such that an increased speed with diminished torque is desired, the terminal $c'$ of the accelerator C' is closed and the series field of the secondary armature is weakened, causing an increase of speed of the secondary armature above that given by the normal speed of the engine, this increase being continued as the contact $c'$ moves toward the left and more and more nearly short circuits the secondary series field F'.

In the direct running, as above described, it is assumed that the relay armature $t$ is in contact with the point 15. This is the condition as the forward running starts, the battery being idle, except as to lights, ignition, etc. However, as the engine speeds up a sufficient current is generated through the shunt field and the line 34 to energize the magnet T in series with this shunt. This draws up the armature $t$ into the position shown in Fig. 2, so that the armature contacts with the point 16, and the shunt continues via the line 36 through the battery to the line 25 instead of through the resistance R to this line. Accordingly at the proper speed the battery is substituted for the resistance R, which as stated has substantially the same ohms.

The transfer relay prevents the battery being in circuit before the charging voltage is sufficient to overcome the battery voltage, hence the battery has no opportunity to run down. In the normal forward running of the parts when the battery is being charged the transfer relay has the position shown in Fig. 2.

When it is desired to drive the car in the reversed direction, the starting switch has the same position as in forward running, but the controlling switch is shifted to the opposite direction, as shown in Fig. 3. This connects the line 25 from the brush 17 of the primary armature with the terminal 6 instead of the terminal 4, and thus this current passes to the terminal 1 and through the line 30 and the secondary armature to the line 31 to the terminal 4 to the terminal 3, to the terminal 2 to the line 24 through the field F' to the lines 23 and 22, field F, line 21, terminals 7 and 10, terminals 8 and 9, and line 27 to the brush 18.

The polarity therefore of the secondary armature, it will be seen, has been changed, and it rotates in the opposite direction, driving the car rearwardly. On this low speed there is not enough current through the shunt line 34 to energize the transfer relay T, and its armature $t$ stays in contact with the point 15, directing the current through the resistance R to the line 25. The battery is therefore idle.

It is to be understood that the particular form of transfer relay, starting switch and controlling switch may be varied as desired. Fig. 4 illustrates simply one form of transfer relay. In this relay the electro-magnetic movement of the armature $t$ is opposed by a spring $t'$ adjusted by a screw $t^2$. By means of this adjustment the speed at which the transfer relay shifts from the resistance contact 15 to the battery contact 16 may be varied as desired.

In order that there may be no opening of the circuit through the shunt winding $f$ during the movement of the relay T, the relay armature $t$ does not leave the point 15 until after it has contacted with the point 16. This may be accomplished by providing springs $t^3$ and $t^4$ on the armature $t$, as shown in Fig. 4, these springs being positioned to engage the respective contact points 15 and 16, but being light enough so that they are overcome by the force of the spring $t'$ or the properly energized magnet T. When the armature moves from the position shown in Fig. 4 toward the contact 16 the spring $t^3$ remains in contact with the point 15 until after the spring $t^4$ has engaged the contact 16. This causes a momentary short-circuiting of the battery, but the period of time is so short that it is immaterial.

The starting switch S may also be of any suitable form. I have shown eight contact points and two contact plates each adapted to connect either of two pairs of points. These connected plates are illustrated in the diagrams as bars connected by wires and in Figs. 5 and 6 as metallic blocks set into an insulating plate. Any suitable construction may be employed which in one position connects together the two terminals of two pairs and in the other position connects the two terminals of other two pairs of contacts. In Fig. 5, I have shown the body $s$ of the switch as connected by a link $s'$ with a bell-crank $s^2$, which is connected with the pedal P, but any suitable construction may be employed to operate the switch. A spring $s^3$ normally tends to hold the switch in the uppermost position, but it may be readily depressed into the position shown in Fig. 5 for starting, by pressure on the foot-pedal P.

It will be seen from the above description that my battery charging, starting and lighting system may be very readily applied; does not in any manner interfere with the regularity of action of the electro-magnetic transmission; is effective in charging the battery when the electro-magnetically generated current is proper for it, and provides for the battery being always available for starting by simply closing the switch.

It is to be understood that the system is adapted for various forms of electro-magnetic transmission, the arrangement of primary and secondary machines shown in the diagrams being simply illustrations of any suitable electro-magnetic transmission.

Having thus described my invention what I claim is:—

1. A generating unit having a series field winding, a shunt field winding in combination with a resistance and a battery, and a transfer relay adapted to transfer current through the shunt winding either through the resistance or battery.

2. The combination of a generating unit having series field and shunt field windings, a battery and a resistance equivalent to the battery, either of which may be in series with the shunt winding, and a transfer relay for shifting from one to the other at the proper time.

3. The combination of a generating unit having series and shunt field windings, a battery, a resistance substantially equivalent to the resistance of the battery, a relay having its winding and its armature both in series with the shunt winding, a pair of contact points with which said armature may coact alternatively, a conductor from one contact point leading through the resistance, a conductor from the other contact point leading through the battery, either of said conductors being adapted to complete the circuit of the shunt winding, and means for adjusting said relay to cause its armature to remain in contact with the point connected with the resistance until the current flowing through the shunt winding is sufficient to charge the battery, whereupon said armature is shifted into contact with the battery contact point.

4. In a battery charging system, the combination of primary and secondary armatures, one feeding the other, field windings for the armatures, one of which includes a shunt winding, a resistance, a battery, and a transfer relay adapted to complete the circuit of the shunt winding alternatively through the resistance or the battery.

5. In a battery charging system, the combination of primary and secondary armatures, one feeding the other, windings for the armatures, one of which includes a shunt winding, a resistance, a battery, and a transfer relay adapted to complete the circuit of the shunt winding alternatively through the resistance or the battery, the battery having an internal resistance substantially equal to that of the resistance mentioned and the relay establishing the connection through one of such resistance elements before it has broken it through the other.

6. The combination of a generating unit adapted to be mechanically driven and having a primary armature and series and shunt windings, a motor unit adapted to be electro-magnetically driven by the generator unit and comprising a secondary armature and a series field, a battery, a resistance, and a transfer relay adapted to include either said resistance or the battery in series with the shunt winding of the generating unit.

7. The combination of a generating unit adapted to be mechanically driven and having a primary armature and series and shunt windings, a motor unit adapted to be electro-magnetically driven by the generator unit and comprising a secondary armature and a series field, a battery, a resistance, and a transfer relay having its magnet in series with said shunt winding and adapted to include either said resistance or the battery in series with said shunt winding.

8. The combination of a generating unit adapted to be mechanically driven and having a primary armature and series and shunt windings, a motor unit adapted to be electromagnetically driven by the generator unit and comprising a secondary armature and a series field, a battery, a resistance substantially equivalent to the resistance of the battery, and a transfer relay adapted to include either said resistance or the battery in series with the shunt winding of the generating unit, said transfer relay having its magnet in series with said shunt winding and being adjustable to cause its armature to shift from the resistance connection to the battery connection when a sufficient current is flowing to properly charge the battery.

9. The combination of a generating unit having series and shunt windings, a motor unit electrically driven by the generator unit and having a series winding, a switch in the circuit of the generator unit for setting the connections, a controlling switch in the circuit of the motor unit, a battery and a resistance both connected to the generator circuit and either forming a portion of the circuit of the shunt winding, the two lines from the battery and the resistance respectively terminating at opposite contact points of a relay, said relay having its armature in series with the shunt winding, said armature operating between said contact points and adapted to coact with either of them.

10. The combination of a generating unit having series and shunt windings, a motor unit electrically driven by the generator unit and having a series winding, a switch in the circuit of the generating unit, a switch in the circuit of the motor unit, a battery and a resistance, both connected to the generator circuit and either forming a portion of the circuit of the shunt winding, the two lines from the battery and the resistance respectively terminating at opposite contact points of a relay, the relay armature operating between the contact points and adapted to coact with either of them and remain in contact with one unit after it is contacted with the other and a spring tending to retain the armature in contact with the resistance terminal.

11. The combination of a generating unit having series and shunt windings, a motor unit electrically driven by the generator unit and having a series winding, a switch in the circuit of the generator unit, a controller circuit in the circuit of the motor unit, a battery, a resistance equivalent to the resistance of the battery, both connected to the generator circuit and either forming a portion of the circuit of the shunt winding, the two lines from the battery and the resistance respectively terminating at opposite contact points, a relay having its winding and armature in series with the shunt winding, said relay armature operating between said contact points and adapted to coact with either of them and remain in contact with one until after it is contacted with the other, a spring tending to retain the armature in contact with the resistance terminal.

12. The combination of a generating unit having a series winding and a shunt winding, a battery, a resistance substantially equivalent to the resistance of the battery, a relay having its winding and its armature both in series with the shunt winding, a pair of contact points with which said armature may coact alternatively, a circuit from one contact point leading through the resistance, a circuit from the other contact point leading through the battery, either of said circuits being adapted to complete the circuit of the shunt winding, means for establishing an additional resistance shunt about said series winding, and means for varying the resistance of the last mentioned shunt.

13. In a battery charging system, the combination of primary and secondary armatures, one feeding the other, field windings for the armatures, one of which includes a shunt winding, a resistance, a battery, a transfer relay adapted to establish the circuit of the shunt winding alternatively through the resistance or battery, and a variable resistance forming a shunt about one of said field windings.

14. In a battery charging system, the combination of primary and secondary armatures, the former feeding the latter, a series and shunt field windings for the primary armature, a series winding for the secondary armature, a resistance, a battery, a transfer relay adapted to establish the circuit of the shunt winding alternatively through the resistance or battery, and a variable resistance adapted to constitute a shunt about one of said series field windings.

15. The combination of a generating unit having series and shunt windings, a motor unit having a series winding, a transfer relay having its magnet in series with said shunt winding, two circuit paths for completing the circuit of the shunt winding, one of said paths including a battery and the other including a resistance equivalent to the battery, said relay being adapted to close either of said paths selectively, variable resistance shunts about the two series windings respectively, and means independently varying the resistance in the latter shunts.

In testimony whereof, I hereunto affix my signature.

CHARLES E. F. AHLM.